United States Patent Office 3,363,984
Patented Jan. 16, 1968

3,363,984
PREPARATION OF III–V COMPOUNDS
Robert A. Ruehrwein, Dayton, Ohio, assignor to Monsanto Company, a corporation of Delaware
No Drawing. Filed June 18, 1959, Ser. No. 821,101
8 Claims. (Cl. 23—204)

The present invention relates to a new method for the production of inorganic compounds of the III–A — V–A groups of elements of the Periodic Table. In particular the present invention is concerned with compounds based upon one component from group III–A elements having atomic weights of from 10 to 119, and one component from group V–A elements having atomic weights of from 29 to 31. It is an object of this invention to provide new compositions of matter and a process for the production of the same as well crystallized, hard, thermally stable material certain of which are also characterized by unusual chemical inertness and stability. It is a further object to provide chemical material of a purity suitable for use in the manufacture of electrical components such as semiconductors. It is still further object of this invention to provide a process by which shaped structures, such as refractory articles, chemical apparatus, turbine blades, and combustion fittings exemplified by combustion chambers and nozzles may be prepared.

Further objects and advantages of the invention will be apparent from the following description.

It has been found that III–A — V–A compounds of unusual purity, and having the necessary electrical properties for use as semiconductor components may be prepared by the reaction of a gaseous III–A compound, such as a boron halide and a gaseous V–A compound, such as phosphorus halide in the presence of hydrogen. Examples of boron compounds which are gaseous under the present reaction conditions include the boron halides, e.g., boron trichloride, boron tribromide, and boron triiodide; and also alkyl boron compounds such as trimethyl boron, triethyl boron, tripropyl boron, triisopropyl boron, and tri-tert-butyl boron, as well as alkylated boranes, such as ethyl alkylated pentaborane, and ethyl alkylated decaborane having variable degrees of alkylation; and boron hydrides including diborane, pentaborane and decaborane. Other group III–A starting materials which are employed in the present invention include the corresponding halides and alkyl compounds of aluminum, gallium and indium. Such metals are preferably employed as the halides, for example, the chlorides, bromides and iodides, although the various alkyl and halo-alkyl derivatives may similarly be used, e.g., trimethyl gallium, trimethyl aluminum, trimethyl indium, triethyl gallium, methyl gallium dichloride, triethyl aluminum, triisobutyl aluminum. The group V–A compounds which are of particular utility include the halides of arsenic and phosphorus. The chlorides are preferred as the source material for the group V–A components employed in the present method. The phosphorus halides which are contemplated include phosphorus trichloride, phosphorus tribromide and phosphorus triiodide, phosphorus pentachloride and phosphorus pentabromide.

In conducting the vapor phase reaction between the group III–A and the group V–A component for the production of a crystalline solid III–A — V–A compound, it is essential that gaseous hydrogen be present in the system, and that oxidizing gases be excluded. The partial pressure of the III–A component in the gas phase (calculated as the partial pressure of the monatomic form of the III compound) is from 0.05 to 0.15 atmosphere of partial pressure, while the VA component is present in the proportion of from 0.10 to 0.20 atmosphere of partial pressure (also calculated with respect to the monatomic form of the V–A compound). The partial pressure of the hydrogen may vary in the range of from 0.70 to 0.85 atmosphere. However, it should be recognized that this representation of partial pressure imposes no limitation upon the total pressure in the system which may vary in the range of from 0.1 micron to several atmospheres, for example, 1500 mm. Hg.

The preferred partial pressures of the gaseous group III–A compounds and the group V–A compounds together with the proportion of hydrogen employed in the practice of the present invention are shown in the general proportions set forth below.

Group III–A compounds _____ 0.05–0.15
Group V–A compounds _____ 0.10–0.20
Hydrogen _____ 0.85–0.70

The partial pressure of the group V–A starting material such as a halide, for example phosphorus trichloride, is preferably at least equivalent to, and still more preferably greater than the partial pressure of the group III–A halide, for example gallium trichloride, or other group III–A compound which is employed. A preferred embodiment is the use of a partial pressure for the group V–A compound which is at least twice that of the group III–A compound. The partial pressure of hydrogen should then be at least twice that of the combined partial pressures of the group III and group V halides. These relationships are expressed specifically in the numerical proportions set forth above.

The present process may be illustrated by the following chemical equation:

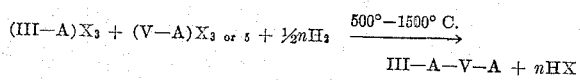

$$(\text{III--A})X_3 + (\text{V--A})X_{3 \text{ or } 5} + \tfrac{1}{2}nH_2 \xrightarrow{500°-1500° \text{C.}} \text{III--A--V--A} + n\text{HX}$$

where $X$=halide, $n$=the sum of the X atoms, III–A represents boron, aluminum, gallium or indium and V–A represents phosphorus or arsenic.

The temperature mentioned in carrying out the reaction between the above described III–A compound and the V–A compound in the presence of hydrogen will generally be above about 500° C. to as much as 1500° C., a preferred operating range being from 800° C. to 1300° C. Still more preferred ranges of temperatures for making individual products constituting species within the generic temperature range are:

| | °C. |
|---|---|
| BP | 800–1200 |
| InP | 700–1000 |
| GaP | 1000–1200 |
| GaAs | 900–1200 |
| InAs | 700–1000 |
| AlP | 800–1100 |
| AlAs | 1000–1200 |

The time required for the reaction is dependent upon the temperature and the degree of mixing and reacting. The III–A and V–A gaseous components may be introduced individually through nozzles, or may be premixed as desired. However, it has been found that when the three respective components are subjected to the above temperatures, a solid product is formed which precipitates from the gaseous phase and may be collected as powder, and particularly under slower agitation and/or the use of a high temperature of the pre-form object, is deposited as a smooth coating upon a preformed object which is located in the reaction zone. In this way it has been found that it is easily possible to provide a hard, chemical resistant coating upon base objects. For example, a chemically and thermally resistant rocket nozzle is made by employing a preform of the desired shape fabricated from a metal such as molybdenum. When this is placed in the reaction zone and subjected to impingement of a stream of phosphorus chloride and boron trichloride in the presence of hydrogen, within the proportions and temperature limitations set forth above, a dense coating of crystalline boron phosphide is obtained on the preform. The coating thus obtained is resistant to hot combustion gases and may be subjected to high temperatures as well as conditions of thermal shock without substantial deterioration. The yields obtained in the present process are quite high, approaching the theoretical yields.

The apparatus which is employed in carrying out the present invention consists of a heated vessel into which the gaseous reactants are introduced either in individual streams or as a composite mixture. A preferred form of apparatus is a hot tube reactor which may be made of conventional refractories such as quartz, porcelain, etc. Such a tube may be heated by electrical resistance coils, or by direct resistance heating for example when employing a carborundum tube. The solid III–A—V–A compound is precipitated from the vapor phase by the action of the volatile III–A compound with the V–A compound in the presence of hydrogen. This product may accordingly be readily removed from the bottom of the tube or in some instances may deposit as a circular ring or uniform coating of the tube from which it is thereafter removed such as by scraping.

Another embodiment of the invention is to utilize the hot wire type of reactor in which the gaseous reactants and hydrogen are introduced into a reaction vessel in which a hot filament is located. In this embodiment of the invention the product is deposited upon the filament and is thereafter removed by conventional means such as shaking or scraping. For example the wire which is employed in this embodiment of the invention may be made of tantalum, tungsten, titanium or molybdenum. The wire is brought to the desired temperature in the range set forth above for the present reaction. Suitable electrical heating means permit a control of the temperature of filament as desired.

Boron phosphide as herein prepared is a highly crystalline material with a cubic crystalline structure having a unit cell length of about 4.537 Angstrom units. Its hardness lies at about 9 on Moh's scale (diamond=10). It has been found that it will scratch and abrade quartz, porcelain, agate, cemented tungsten and sapphire. The crystalline material is quite light, having a particle density by the pycnometer method of 2.94 (theoretical, 2.97).

The crystalline form of boron phosphide is resistant to oxidation when exposed to an oxy-hydrogen flame having a flame temperature of 4000° C. In addition, it has been found that a sample at this temperature can be subjected to an oxygen jet from a cutting torch without appreciable deterioration of the crystalline boron phosphide.

The indium phosphide prepared by the present invention is an unusually pure material having an energy gap value of about 1.3 electron volts, as an indication of the suitability for the preparation of semiconductor compositions.

An advantage of the present method for the production of III–A—V–A compounds by the reaction in the vapor phase of a group III–A compound and a group V–A compound, preferably the halides, in the presence of hydrogen is the ease of obtaining high purity products. In contrast to this method, the conventional method for the preparation of III—V compounds beginning with the respective elements from the group III and group V series required a difficult purification technique for the metals. The conventional purification procedures are not as effective when dealing with the metals in contrast to the compounds employed in the present invention. For example, distillation, recrystallization and other conventional purification methods are readily applicable to the starting compounds employed in the present process. Furthermore, the high-temperature vapor-phase reaction employed in the present method inherently introduces another factor favoring the production of pure materials, since the vaporization and decomposition of the respective group III and group V compounds, e.g. the halides, results in a further rejection of impurities. The desired reaction for the production of the III–A—V–A compound occurs only between the group III–A element and the group V–A element to yield the III–A—V–A compound. As a result, it is found that unusually pure materials which are of utility in various electrical and electronic applications such as in the manufacture of semiconductors are readily obtained.

Example 1

The preparation of boron phosphide was carried out by employing boron trichloride introduced into a tubular reactor in gaseous form in a mixture in which this component was present at a partial pressure of 0.10 atmosphere together with phosphorus trichloride in vapor form at a partial pressure of 0.20 atmosphere while the remaining constituent was hydrogen at a partial pressure of 0.70 atmosphere. The tubular reactor was maintained at a total pressure of 1 atmosphere and a temperature of 1020° C. for a period of 136 minutes. As a result of the interaction of the boron trichloride, phosphorus trichloride and hydrogen a solid product was obtained as a deposit upon the wall of the reaction zone corresponding to 2.75 grams of crystalline boron phosphide. Based upon a total charge of 12.7 grams of boron trichloride, this represented a yield of 60%.

The boron phosphide product existed in a cubic crystalline form having a unit cell length of about 4.537 Angstrom units. The hardness of the product is about 9.2 on Moh's scale (diamond=10). This material will scratch and abrade quartz, porcelain, agate, cemented tungsten and sapphire. When exposed to a flame of 1200° C. in air it will not burn. This material is also resistant to attack by mineral acids including boiling nitric acid and boiling aqua regio. It was found to be impossible to burn the crystalline boron phosphide in an atmosphere of chlorine at 3 atmospheres pressure, even when red phosphorus was used as an initiator. Because of the unusual thermal and chemical stability of this material it is very useful in the fabrication of chemical apparatus including crucibles, refractories and parts of jet engines such as turbine blades, deflectors or nozzles which are normally exposed to high temperatures. By reason of the extreme hardness of the product, these fabricated parts are resistant to the action of abrasive particles such as fly ash which may be present in the high temperature gases of a jet engine. The energy gap value of the product is about 5.9 electron volts, which is indicative of the utility of this material for semi-conductor applications.

Example 1

In order to produce gallium phosphide, a quartz tube reactor was provided with an inlet gas system to introduce a gas mixture composed of phosphorus trichloride at a partial pressure of 0.15, gallium trichloride at a partial pressure of 0.05 and hydrogen at a partial pressure of 0.80. The total pressure on the system was 15.20 mm. The reaction system was maintained at a temperature of 1150° C. for a period of 180 minutes. During this time 17.61 grams of gallium trichloride were introduced to give 5.02 grams of gallium phosphide corresponding to a yield of 50%. X-ray diffraction patterns of the product showed a zinc blende structure with a lattice parameter value of $a_0=5.45$ angstrom units. The product had a deep orange color. The energy gap value of the gallium phosphide was about 2.4 electron volts.

Example 3

The production of indium arsenide at a reaction temperature of 900° C. was carried out using a gaseous flow system in which individual streams of gaseous reactants were introduced into a quartz tube. The relative proportions of the reactants were 0.10 atmosphere of partial pressure of indium trichloride, 0.20 atmosphere of partial pressure of arsenic trichloride and 0.70 atmosphere of partial pressure of hydrogen (total pressure of 760 mm.). The gaseous reactants were introduced into the tube for a period of 240 minutes which provided for the addition of 22.12 grams of indium trichloride. The solid product obtained was indium arsenide in a yield of 40%. The product was subjected to X-ray diffraction analysis and was found to have a zinc blende structure with a lattice parameter value of $a_0 = 6.06$ Angstrom units. The energy gap value of the product was about 0.35 electron volt.

*Example 4*

The preparation of aluminum arsenide was carried out using a gaseous mixture composed of arsenic trichloride at a partial pressure of 0.15 atmosphere, aluminum trichloride at a partial pressure of 0.10 atmosphere, and hydrogen at a partial pressure of 0.75 atmosphere (total pressure 1 atmosphere). This mixture was introduced into a quartz tube maintained at 1000° C. The reaction was conducted for a period of 200 minutes during which 13.3 grams of aluminum trichloride were charged to the reactor to give 5.1 grams aluminum arsenide corresponding to a yield of about 50%. The product obtained was a dark grey microcrystalline material which upon X-ray analysis was found to have a zinc blende structure with a lattice parameter value of $a_0 = 5.62$ Angstrom units. The energy gap value of the product was about 2.2 electron volts.

*Example 5*

Indium phosphide was prepared by the reaction in vapor phase of indium trichloride at a partial pressure of 0.20, phosphorus trichloride at a partial pressure of 0.40 and hydrogen at a partial pressure of 1.40, with the total pressure in the system being 2 atmospheres. The said gaseous reactants were lead into a porcelain tube maintained at a temperature of 1000° C. during a reaction period of 240 minutes. During this time 22.1 grams of indium trichloride were charged to give a crystalline solid product of indium phosphide in the amount of 5.83 grams and corresponding to a yield of about 40%. The dark grey product had a melting point of about 1060° C. Upon X-ray diffraction analysis the microcrystalline product was found to have a zinc blende structure with a lattice parameter value of $a_0 = 5.87$ Angstrom units.

A small crystal of the product was measured for its electrical conductivity and was found to correspond to the presence in the indium phosphide of about 10 parts per million of impurities per cc. which represents a high order of purity for semi-conductor applications. The energy gap value was about 1.3 electron volts. The product also displayed electrical rectifying properties.

What is claimed is:

1. Method for the preparation of boron phosphide which comprises combining in the gas phase at a temperature of from 800° C. to 1200° C. boron trichloride at a partial pressure of from 0.05 to 0.10, together with phosphorus trichloride at a partial pressure of from 0.10 to 0.20 together with hydrogen at a partial pressure or from 0.70 to 0.85.

2. Method for the preparation gallium phosphide which comprises combining in the gas phase at a temperature of from 1000° C. to 1200° C. gallium trichloride at a partial pressure of from 0.05 to 0.10, and phosphorus trichloride at a partial pressure of from 0.10 to 0.20 together with hydrogen at a partial pressure of from 0.70 to 0.85.

3. Method for the production of indium arsenide which comprises reacting in the gas phase at a temperature of from 700° C. to 1000° C. indium trichloride at a partial pressure of 0.05 to 0.10 and arsenic trichloride at a partial pressure of from 0.10 to 0.20 together with hydrogen at a partial pressure of from 0.70 to 0.85.

4. Method for the production of aluminum arsenide which comprises reacting in the gas phase at a temperature of from 1000° C. to 1200° C. aluminum trichloride at a partial pressure of from 0.05 to 0.10 and arsenic trichloride at a partial pressure of from 0.10 to 0.20 together with hydrogen at a partial pressure of from 0.70 to 0.85.

5. Method for the preparation of indium phosphide which comprises combining in the gas phase at a temperature of from 700° C. to 1000° C., indium trichloride at a partial pressure of from 0.05 to 0.10 and phosphorus trichloride at a partial pressure of from 0.10 to 0.20 together with hydrogen at a partial pressure of from 0.70 to 0.85.

6. Method for the production of gallium arsenide which comprises reacting in the gas phase at a temperature of from 900°–1200° C. gallium trichloride at a partial pressure of from 0.05–0.15 arsenic trichloride at a partial pressure of from 0.10–0.20 and hydrogen at a partial pressure of from 0.70–0.85.

7. Method for the preparation of high purity compounds of group III–A elements selected from the group consisting of boron, aluminum, gallium and indium and group V–A elements selected from the group consisting of phosphorous and arsenic, which comprises reacting in the gas phase at a temperature within the range of from 500° C. to 1500° C. a volatile halide of said group III–A elements at a partial pressure of from 0.05 to 0.15 together with a volatile halide of said group V–A elements at a partial pressure of from 0.10 to 0.20 and hydrogen at a partial pressure of from 0.70 to 0.85, said halides being selected from the group consisting of bromides, chlorides and iodides of said elements, the partial pressure of said group III–A halide being at least equivalent to that of said group V–A halide.

8. Method for the preparation of high purity cubic crystalline boron phosphide which comprises reacting in the gas phase at a temperature of from 800° C. to 1500° C. a volatile halide of boron at a partial pressure of from 0.05 to 0.10 together with a volatile halide of phosphorus at a partial pressure of from 0.10 to 0.20 and hydrogen at a partial pressure of from 0.70 to 0.85, said halide being selected from the group consisting of bromides, chlorides and iodides.

References Cited

UNITED STATES PATENTS

| 2,974,064 | 3/1961 | Williams et al. | 23—204 |
| 3,021,196 | 2/1962 | Merkel | 23—204 |
| 2,966,426 | 12/1960 | Williams et al. | 23—204 X |
| 2,313,410 | 3/1943 | Walther. | |

OTHER REFERENCES

Bancroft et al.: "Journal of Physical Chemistry," vol. 18, pp. 257–259, (1914).

Campbell et al.: "Journal of The Electrochemical Society," vol. 96, pp. 318–333 (1949), page 326 particularly relied on.

Perri et al.: "Acta Crystallographica," vol. 11, No. 4, page 310 (April 1958).

Ryss: "The Chemistry of Fluorine and Its Inorganic Compounds," United States Atomic Energy Commission, AEC-tr 3927, Feb. 1960, pp. 266, 482.

Gazzetta Chimica Italiana, vol. 7, No. 1, 1941 pp. 58–62.

Babor et al.: "General College Chemistry," 1940, page 88.

Mellor (I): "Comprehensive Treatise on Inorganic and Theoretical Chemistry," 1928, vol. 8, pages 833, 834.

Mellor (II): "Comprehensive Treatise on Inorganic and Theoretical Chemistry," 1929, vol. 9, page 79.

Gmelin-Kraut: "Handbuch der Anorganischen Chemie," 1911, 7th Edition, vol. 1, part III, page 469.

MILTON WEISSMAN, *Primary Examiner.*

MAURICE BRINDISI, EDWARD STERN, OSCAR R. VERTIZ, *Examiners.*

UNITED STATES PATENT OFFICE
CERTIFICATE OF CORRECTION

Patent No. 3,363,984

January 16, 1968

Robert A. Ruehrwein

It is certified that error appears in the above identified patent and that said Letters Patent are hereby corrected as shown below:

Column 1, line 22, "is still" should read -- is a still --. Column 2, line 53, "as powder" should read -- as a powder --. Column 4, line 53, "Example 1" should read -- Example 2 --. Column 5, line 36, "lead" should read -- led --. Column 6, line 31, "III" should read -- V --; line 32, "V" should read -- III --.

Signed and sealed this 31st day of March 1970.

(SEAL)
Attest:

Edward M. Fletcher, Jr.
Attesting Officer

WILLIAM E. SCHUYLER, JR.
Commissioner of Patents